June 20, 1961 D. SAPONARA 2,988,788
GASKET
Filed April 14, 1960
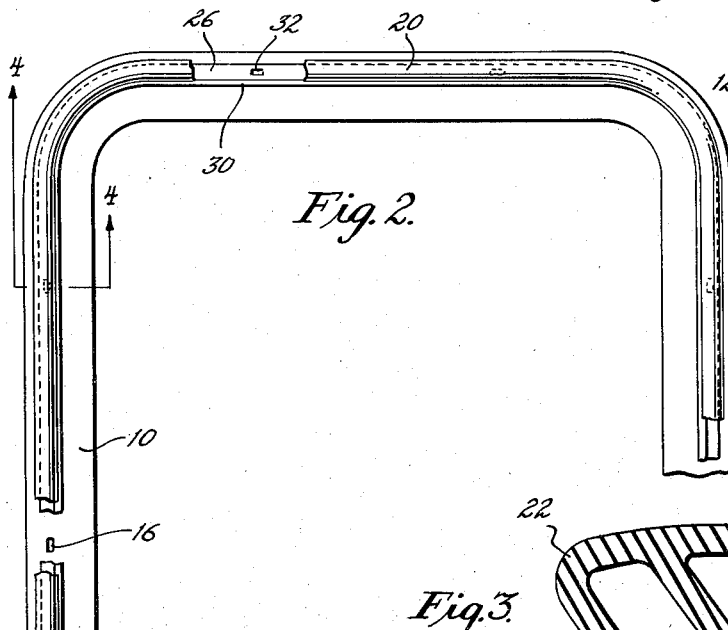
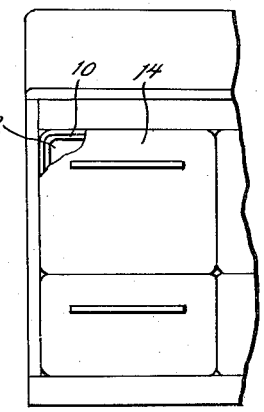
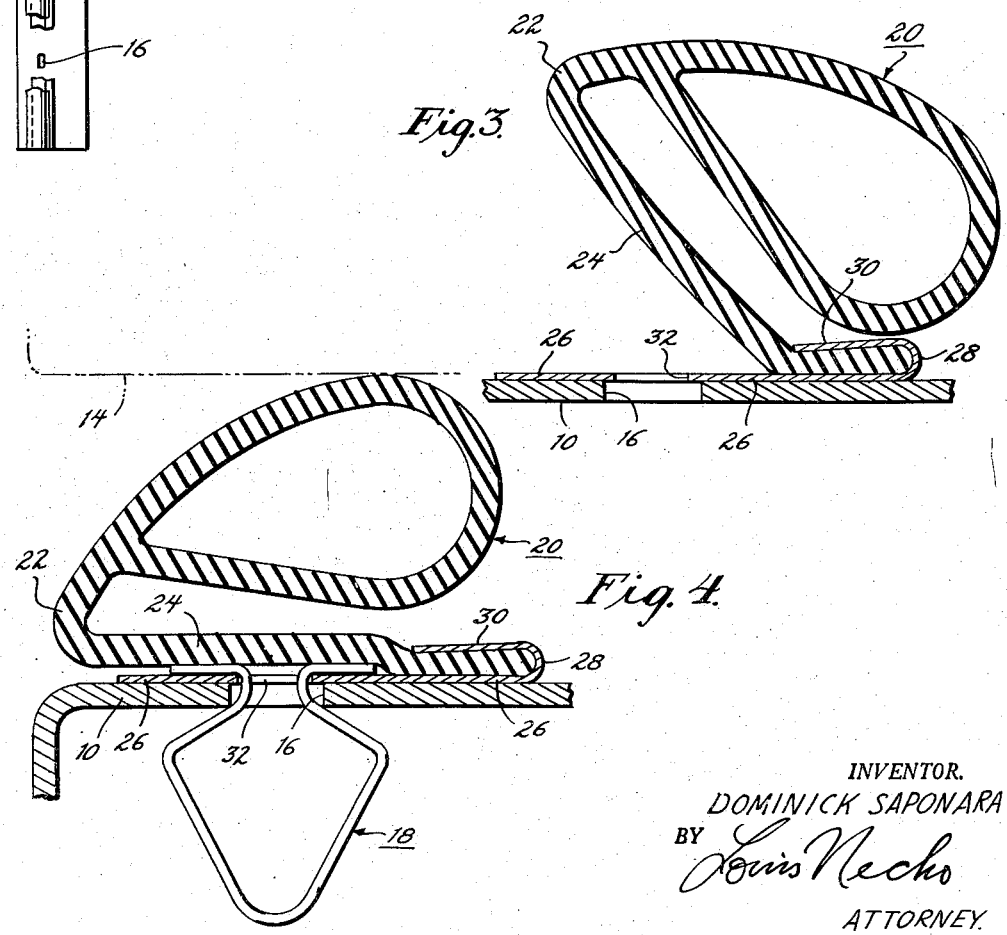
INVENTOR.
DOMINICK SAPONARA
BY
ATTORNEY.

United States Patent Office 2,988,788
Patented June 20, 1961

2,988,788
GASKET
Domenick Saponara, 2833 Washington St., Allentown, Pa.
Filed Apr. 14, 1960, Ser. No. 22,176
1 Claim. (Cl. 20—69)

This invention relates to a gasket of the type disclosed in Patent No. 2,591,003 issued to L. A. Philipp on April 1, 1952.

One object of the invention is to produce an improved gasket of the type set forth.

The gasket disclosed in said patent comprises a flexible and resilient sealing member formed of a compressible, generally oval, bead and a flat flange connected along one edge thereof to one end of the bead, and a relatively rigid backing plate which is interposed between the flange and the bead. In this construction, the backing plate is provided with holes for the spring clips which fasten the gasket in position. Because the backing plate of Philipp is located between the bead of the gasket and its flange (see FIG. 2 of the Philipp patent), it is also necessary to drill holes in the flange of the gasket which register with the holes in the backing plate.

It is, therefore, a further object of the invention to produce a gasket of the type set forth which can be secured in the manner set forth without the necessity of punching any holes in the flange of the gasket.

The manner in which this is accomplished will be understood from the following specification and the accompanying drawing in which:

FIG. 1 is a fragmentary, front elevational view of a cooking stove showing conventional oven and broiler.

FIG. 2 is an enlarged, front elevational view showing the frame which defines the oven opening and to which a gasket embodying my invention is applied, the door, itself, being omitted.

FIG. 3 is a greatly enlarged, sectional view taken on line 3—3 on FIG. 2 and showing the gasket construction and the manner in which it is applied to the door frame.

FIG. 4 is similar to FIG. 3 but showing the position of the parts when the gasket is mounted in position and with the door closed.

In the drawing 10 designates a door frame, which defines the front opening of an oven, or refrigerator 12, etc., and 14 designates a hinged door for closing said opening. The door frame is provided with spaced openings 16 for receiving spring clips 18 which detachably fasten the gasket to the door frame. The gasket is formed of a resilient, compressible material, such as rubber, and includes a hollow, generally oval, bead 20, the narrow end of which is connected by means of intermediate strip 22 to base flange 24. In addition, the gasket includes a backing plate 26 which is secured to base flange 24 and is attachable to the door frame to mount the gasket in position.

It will be noted that, according to my invention, the backing plate is disposed between base flange 24 and the door frame and not between the flange and the bead. This is accomplished by bending a marginal portion of the backing plate to form a U-shaped channel 28 which tightly clamps the free marginal portion 30 of the flange, care being taken to insure that the short leg of the channel engages the face of the flange which faces the bead and that the long leg of the channel is disposed between the flange and the door frame, as clearly shown in FIGS. 3 and 4. By this arrangement only the backing plate need be provided with openings 32 which register with openings 16 in the door frame, with the flange 24 of the gasket remaining wholly imperforate.

To apply the assembled gasket to the door frame, it is necessary to rotate the bead and the flange to the position shown in FIG. 3, to expose openings 32 and 16 to permit the insertion of the spring clips after which the flange and the bead automatically assume the position of FIG. 4 in which the holes and the spring clips are concealed.

What I claim is:

A gasket for attachment to a door frame having spaced openings therein, said gasket including a flexible base flange, a sealing bead connected to one edge, and overlying one side, of said base flange, and a backing plate abutting the other side of said flange, the marginal portion of said plate corresponding to the other edge of said flange, being bent over to form a channel which fixedly encloses a relatively narrow marginal portion of said flange along said other edge thereof, to secure said flange to said plate, there being openings in said plate registering with openings in the door frame for receiving fastening devices for securing said plate to said frame, said openings being normally covered by the remaining, unenclosed portion of said flange, the width of the marginal portion of said flange enclosed in said channel being so related to the width of the remaining, unenclosed portion of said flange, that said bead and said remaining, unenclosed portion of said flange can be rotated about the edge of said channel to expose said opening without disengaging said channel from said marginal portion of said flange.

References Cited in the file of this patent

UNITED STATES PATENTS 2,591,003     Philipp _____ Apr. 1, 1952

FOREIGN PATENTS 389,894     Great Britain _____ Mar. 30, 1933